Patented Apr. 18, 1950

2,504,401

UNITED STATES PATENT OFFICE 2,504,401

ANIMAL FEED

Meine Jan Eits Ernsting, Beemster, and Wybe Thomas Nauta, Amsterdam, Netherlands, assignors to N. V. Koninklijke Pharmaceutische Fabrieken V/H Brocades-Stheeman & Pharmacia, a company of the Netherlands No Drawing. Application July 19, 1948, Serial No. 39,588
In the Netherlands July 26, 1947

1 Claim. (Cl. 99—2)

Especially in the United States of America experiments have been carried out with food for animals to which had been added substances which exert a certain influence on the function of the thyroid gland and in particular have a retarding effect on the metabolic process. These experiments were carried out on chickens. The additions were, inter alia, 2-thiouracil, pulverised dehydrated thyroid gland, stilboestrol. The results of these experiments are rather divergent. Thus, Glazener and Jull (Poultry Sci. 25, 236 (1946)) found that 0.1 and 0.2% of thiouracil in the meal food during the period of growth of chickens suppresses the growth, such more in the case of 0.2% than with 0.1%. Andrews and Schnetzler (Poultry Sci. 25, 124 (1946)) obtained similar results. They fed chickens with food containing 0.075 to 0.2% of thiouracil and state, inter alia, that the retarding of the growth when thiouracil was used in a concentration of 0.2% was more pronounced when artificial light was used at night. It is true that the meat quality of the animals is improved. A gain in weight as compared with that of the animals kept for purposes of control, on the other hand, was found by Mixner, Tower and Upp (Poultry Sci. 25, 536 (1946)) on addition of 0.025, 0.005 and 0.1% of thiouracil respectively to the food of chickens, as also by Schnetzler, Andrews and Hauge (U. S. Egg and Poultry Mag. 51 (11, 554 (1945)), while the latter investigators—such in contrast with the later results of Andrews and Schnetzler; vide above—did not find any appreciably improved effect on the quality of the meat.

Now it was surprisingly found that, whereas according to the literature thiouracil at best yields uncertain results as regards the gain in weight and the quality of the meat, 4-methyl-2-thiouracil invariably produced highly favourable results in various respects in the course of numerous experiments. In order to facilitate comparison, mention may here be made of experiments with chickens which had been raised as much as possible according to the methods usual in the Netherlands.

The experiments were, therefore, carried out with 10–14 weeks old chickens, dependent on the breed, which were "treated" during 10–12 days, while the animals kept for purposes of control grew up under exactly identical circumstances. The "treatment" consisted in feeding the test animals with food containing such a quantity of 4-methyl-2-thiouracil that the chickens were given 50 mg. per day. When compared with the control animals, a great gain in weight (growth of ventral and muscular fat), white meat and smaller losses on killing were found.

A judgment of the quality, in the usual form, is given below:

1st group: Normal food, the chickens being out of doors. Result: 100 per cent 2nd grade.

2nd group: Normal food, combined with the usual fattening cure, each chicken being kept in a separate fattening pen. Result: 10 per cent first-rate, 45 per cent 1st grade, 45 per cent 2nd grade.

3rd group: As 1st group, but with 4-methyl-2-thiouracil added to the food in the quantity indicated. Result: 25 per cent 1st grade, 75 per cent 2nd grade.

4th group: As 2nd group, but with 4-methyl-2-thiouracil added to the food in the quantity indicated. Result: 90 per cent first-rate, 10 per cent 1st grade.

Moreover, 4-methyl-2-thiouracil, as compared with thiouracil has the advantage of being considerably more effective, as a result of which the fattening cure need be only short (here 10–12 days), whereas in the U. S. literature the experiments extended over at least 3 weeks. This is also promoted by the fact that 4-methyl-2-thiouracil has practically no "starting period," whereas the "starting period" of thiouracil amounts to about 8 days.

According to the invention, therefore, a small amount of 4-methyl-2-thiouracil is added to food animals, especially food destined for fattening animals, such as poultry.

The optimum quantity may vary for different species of animals and within each species even for different breeds. It is to be recommended to determine the optimum quantity for each species and for each breed experimentally beforehand. For fattening chickens, for example, it has been found suitable to use such a quantity that the chickens consume an amount of the order of magnitude of about 50 mg. per day.

The concentration in which the 4-methyl-2-thiouracil is used is so small that the animal, when killed, is harmless for consumption. The amount of the said compound present in the meat did not reach the level below which it can no more be determined, i. e. below 1 mg. per 100 g. of meat. On the other hand it is known of thiouracil (in human practice) that the tissue of patients who have been treated with this substance may contain considerable amounts of it, in some cases up to 400 mg. per 100 g. of certain organs.

What we claim is:

An animal feed for increasing the rate of gain in weight of animals containing an effective quantity of 4-methyl-2-thiouracil.

MEINE JAN EITS ERNSTING.
WYBE THOMAS NAUTA.

REFERENCES CITED

The following references are of record in the file of this patent:

UNITED STATES PATENTS

| Number | Name | Date |
|---|---|---|
| 2,456,515 | Kamlet | Dec. 14, 1948 |